United States Patent
Takahashi (10) Patent No.: US 6,590,839 B1
(45) Date of Patent: Jul. 8, 2003

(54) MULTITRACK DISK PLAYER AND METHOD OF READ ERROR RECOVERY

(75) Inventor: Yorio Takahashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/622,295

(22) PCT Filed: Dec. 13, 1999

(86) PCT No.: PCT/JP99/06980
§ 371 (c)(1),
(2), (4) Date: Oct. 27, 2000

(87) PCT Pub. No.: WO00/36603
PCT Pub. Date: Jun. 22, 2000

(30) Foreign Application Priority Data

Dec. 15, 1998 (JP) .......................... 10-355664

(51) Int. Cl.[7] .............................. G11B 20/18
(52) U.S. Cl. ................. 369/30.24; 369/30.22
(58) Field of Search ................ 369/44.32, 44.37, 369/53.11

(56) References Cited

U.S. PATENT DOCUMENTS 6,125,086 A * 9/2000 Araki et al. ................ 369/32
6,137,763 A * 10/2000 Dahan et al. ............... 369/95

FOREIGN PATENT DOCUMENTS

| JP | 3-22263 | 1/1991 |
|----|---------|--------|
| JP | 3-86976 | 4/1991 |
| JP | 06089446 | 3/1994 |
| JP | H6-58466 | 8/1994 |
| JP | 11232662 | 8/1999 |
| WO | 99/19867 | 4/1999 |

OTHER PUBLICATIONS

Japanese search report for PCT/JP99/06980 dated Mar. 14, 2000.

* cited by examiner

Primary Examiner—Aristotelis M. Psitos
(74) Attorney, Agent, or Firm—RatnerPrestia (57) ABSTRACT

An error recovery method and an apparatus achieve error recovery when reading errors occur at one or more addresses on a plurality of simultaneously readable tracks, in a multitrack disk reproducing apparatus. The reproducing apparatus with a plurality of reading head can simultaneously read data on the plurality of adjacent tracks on a disk having the plurality of tracks formed on its recording surface. The method comprises a step for storing a reading error-occurrence-address in an error occurrence, and a step for determining a moving process of the plurality of reading head for error recovery after the error occurrence based on the stored result.

6 Claims, 5 Drawing Sheets

FIG. 1

PRIOR ART

MULTITRACK DISK PLAYER AND METHOD OF READ ERROR RECOVERY

THIS APPLICATION IS A U.S. NATIONAL PHASE APPLICATION OF PCT INTERNATIONAL APPLICATION PCT/JP99/06980.

FIELD OF THE INVENTION

The present invention relates to a multi-track disk reproducing apparatus that transfers data at a high speed by simultaneously reading a plurality of tracks.

BACKGROUND OF THE INVENTION

Conventionally, as a means for increasing a data transfer rate of an optical disk system, a method (it is hereinafter called a multi-beam method) for simultaneously reproducing a plurality of tracks on an optical disk is suggested.

More specifically, this method is used to increase the data transfer rate in the following processes:

(1) A plurality of adjacent tracks are simultaneously read using an optical pickup constituted with plural pairs of light emitting elements and light receiving elements;

(2) The read data are stored in a buffer memory;

(3) The stored data are read out in the same order as the alignment of the tracks on the optical disk.

A conventional multi-beam method is hereinafter described in more details.

Figure 1:
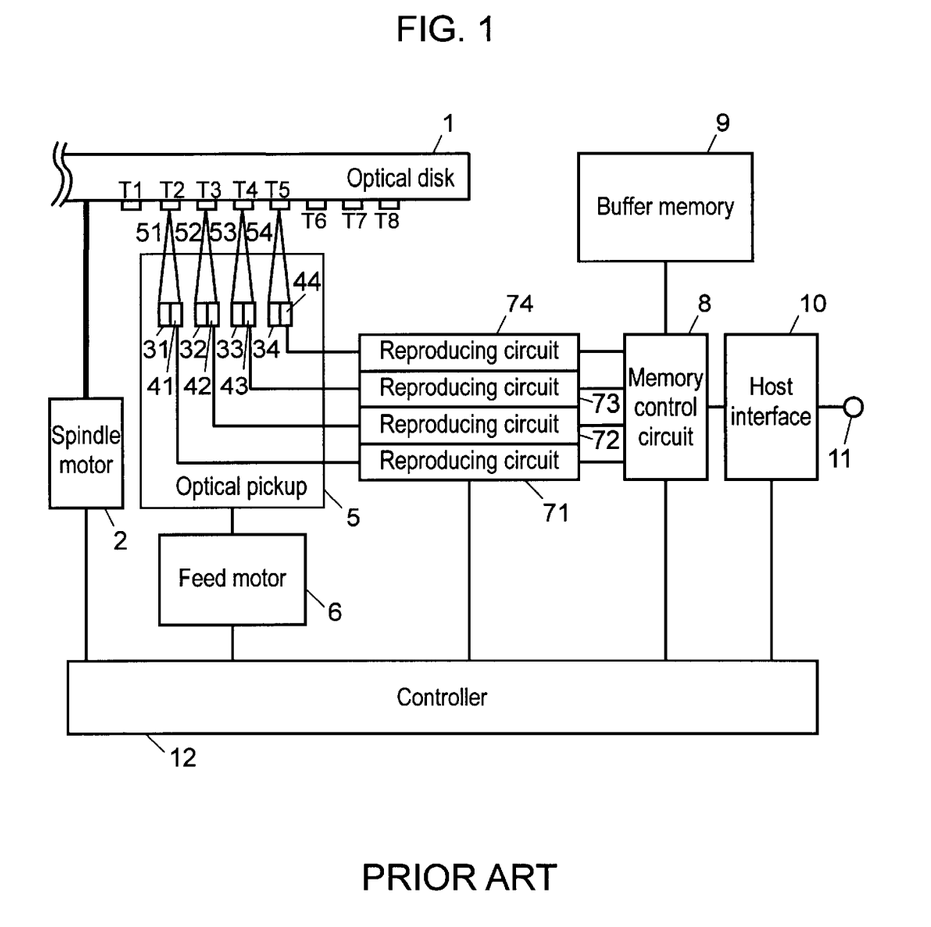
FIG. 1 shows a conventional multi-track disk reproducing apparatus.

FIG. 1 is a block diagram of an optical disk reproducing apparatus for reproducing an optical disk in the conventional multi-beam method. This example shows an apparatus capable of simultaneously reading data on four tracks. The reproducing apparatus comprises the following elements:

(a) optical disk 1 on which tracks are formed concentrically or spirally, (b) spindle motor 2 for supporting and rotating optical disk 1, (c) light emitting elements 31, 32, 33, 34 for respectively radiating laser beams to four adjacent tracks on rotating optical disk 1, (d) light receiving elements 41, 42, 43, 44 that receive reflected lights from respective irradiated tracks and convert them to electric signals, (e) optical pickup 5 constituted with light emitting elements 31, 32, 33, 34 and light receiving elements 41, 42, 43, 44, (f) feed motor 6 for moving optical pickup 5 radially of optical disk 1, (g) reproducing circuits 71, 72, 73, 74 for respectively reproducing independent data read simultaneously from four tracks, based on electric signals supplied from optical pickup 5, (h) memory control circuit 8 that temporarily stores the independent data reproduced by reproducing circuits 71, 72, 73, 74 in buffer memory 9, reads out the reproduced data stored in buffer memory 9 in the same order as the alignment of the tracks on optical disk 1, and transmits it to host interface 10, (i) host interface 10 for receiving reproducing instructions or transmitting the reproduced data from/to a host device through terminal 11, and (j) controller 12 for controlling the elements discussed above.

These elements are configured as shown in FIG. 1.

In this example, simultaneous reading of four tracks is usually allowed, but a reading error occurs in some compact disk—read only memory (CD-ROM) device. Recently, even an individual user has been able to write data onto a CD-ROM disk thanks to diffusion of a CD-R or the like, but disks are widespread which have extremely bad recording states depending on poor characteristic compatibility between a CD-R media and a CD-R drive, or recording speeds. On such CD-ROM device, error occurrence is hardly prevented even by a strong error-correcting-function of the CD-ROM. In addition, a reading error may occur because of a large flaw on the disk or a defect during its manufacture.

When such reading error occurs in a conventional CD-ROM device whose single track is read, generally, its head is immediately returned to the track having the error to try rereading, and the reproducing rate is simultaneously decreased to try reproduction. At this time, however, there is a problem that the reproduction is interrupted to extremely decrease the reading rate. In addition, the similar method is used even for a CD-ROM device whose plural tracks are reproduced simultaneously, and therefore, the similar problem occurs.

DISCLOSURE OF THE INVENTION

For resolving the conventional problem discussed above, a reading-error recovery method in accordance with the present invention has the following characteristics. First, among a plurality of reading means capable of simultaneously reading, the tailing reading means is used for rereading an error-occurrence-address, and the heading reading means continues to read data in an unread region. Next, when the rereading of the error-occurrence-address is completed, depending on number of unread tracks assigned to the plurality of reading means during the rereading of the error-occurrence-address and on an error occurrence position on the track, selective switching is performed between the following processes:

Track jump is carried out immediately and larger number of reading means are assigned to the unread tracks even during the rereading of the error-occurrence-address;

The tracks being read are continuously reproduced without performing any track-jump.

The present invention can restrain reduction of the reading rate to a minimum even when an error occurs and the rereading of the error-occurrence-address is tried.

PREFERRED EMBODIMENTS OF THE INVENTION

Preferred embodiment 1

The embodiment 1 of the present invention is described hereinafter with reference to FIG. 2, FIG. 3, FIG. 4, and FIG. 5.

Figure 2:
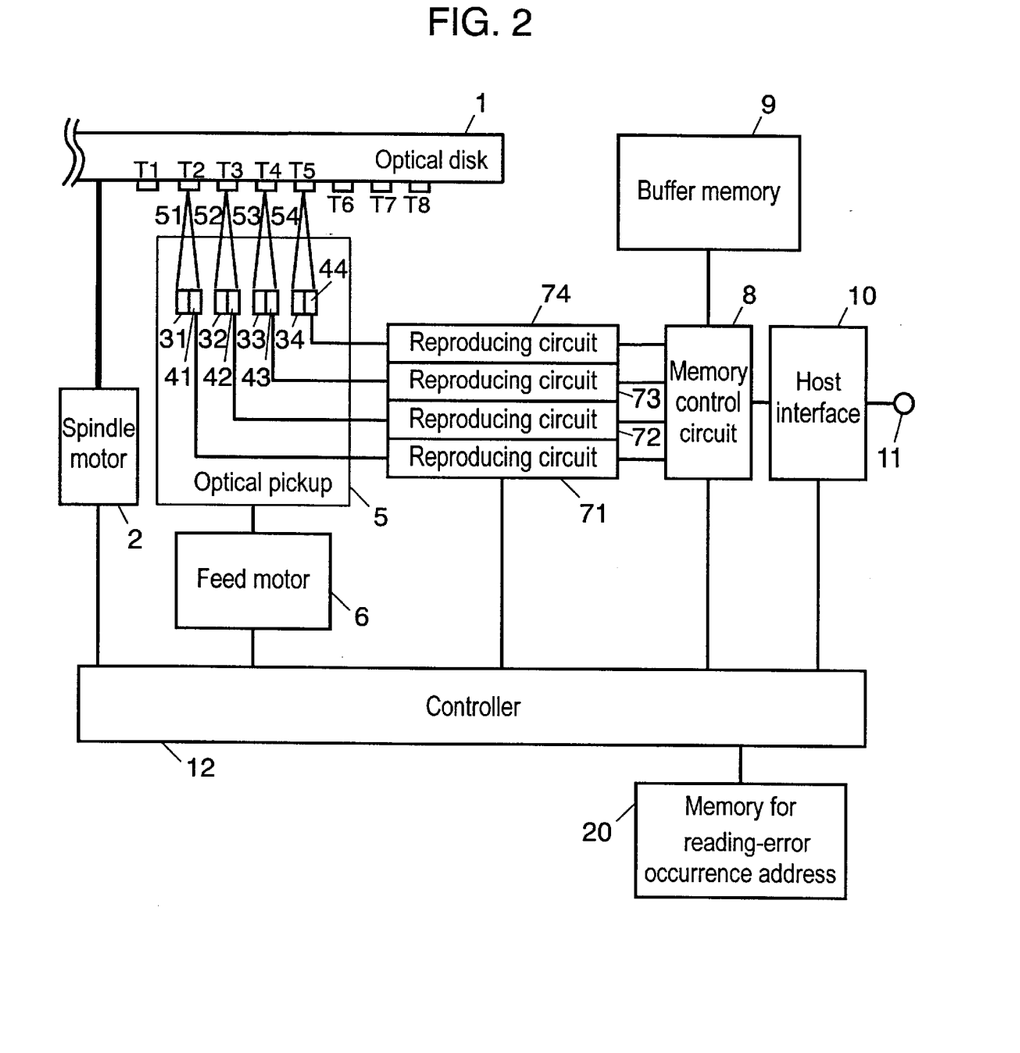
FIG. 2 shows a multi-track disk reproducing apparatus in accordance with the present invention.

FIG. 2 is a block diagram of an optical-disk-reproducing-apparatus for reproducing an optical disk in a multi-beam method in accordance with the present invention.

Figure 3:
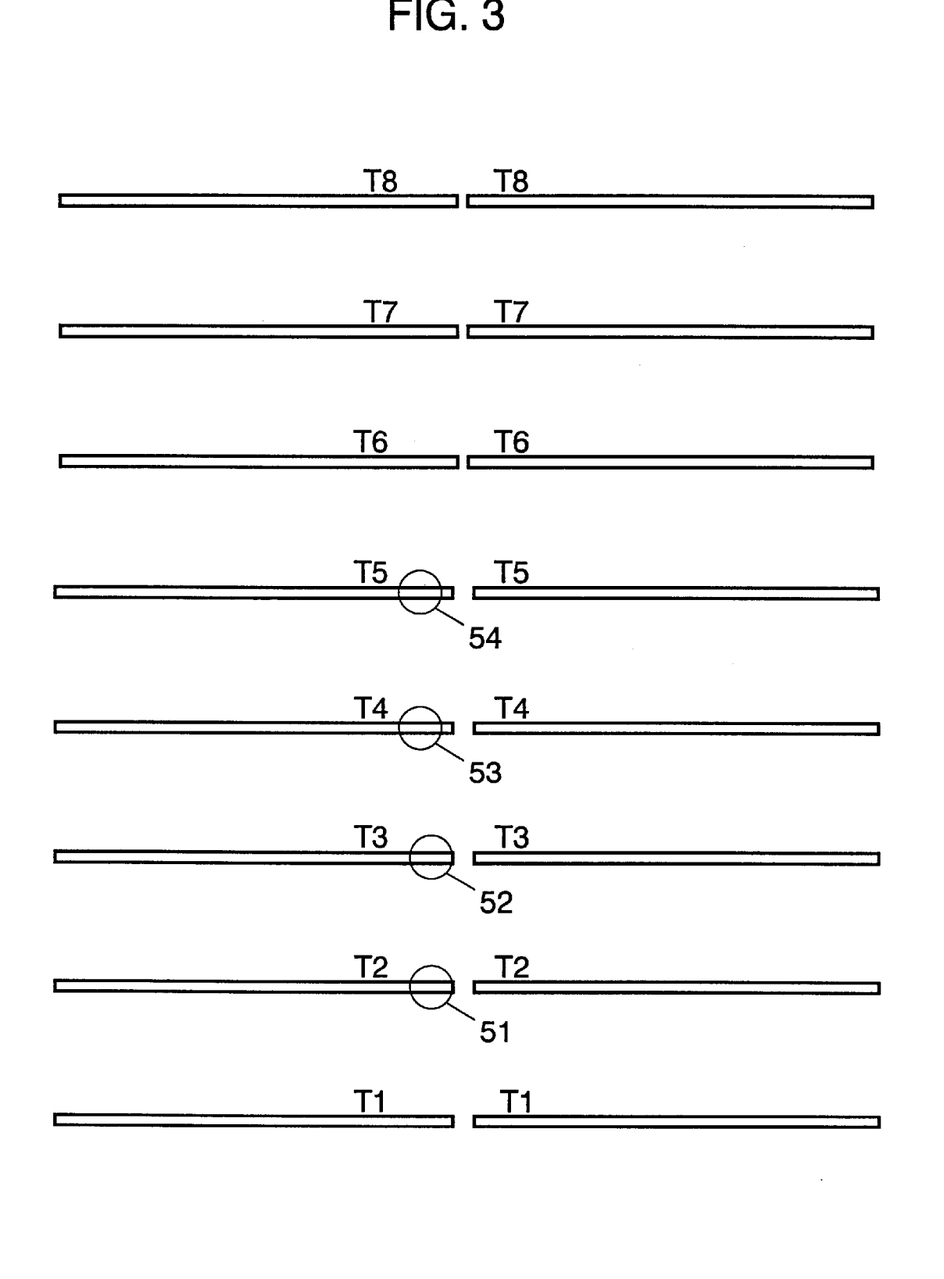
FIG. 3 is a track alignment diagram of an information disk on which tracks are concentrically formed.

FIG. 3 is a track alignment diagram of an information disk on which tracks are concentrically formed, and reproducing beams 51, 52, 53, 54 respectively trace tracks Tn, Tn+1, Tn+2, Tn+3.

Reproducing beams 51, 52, 53, 54 move left with respect to the disk with rotation of the disk, and return to their original positions after one rotation.

Figure 4:
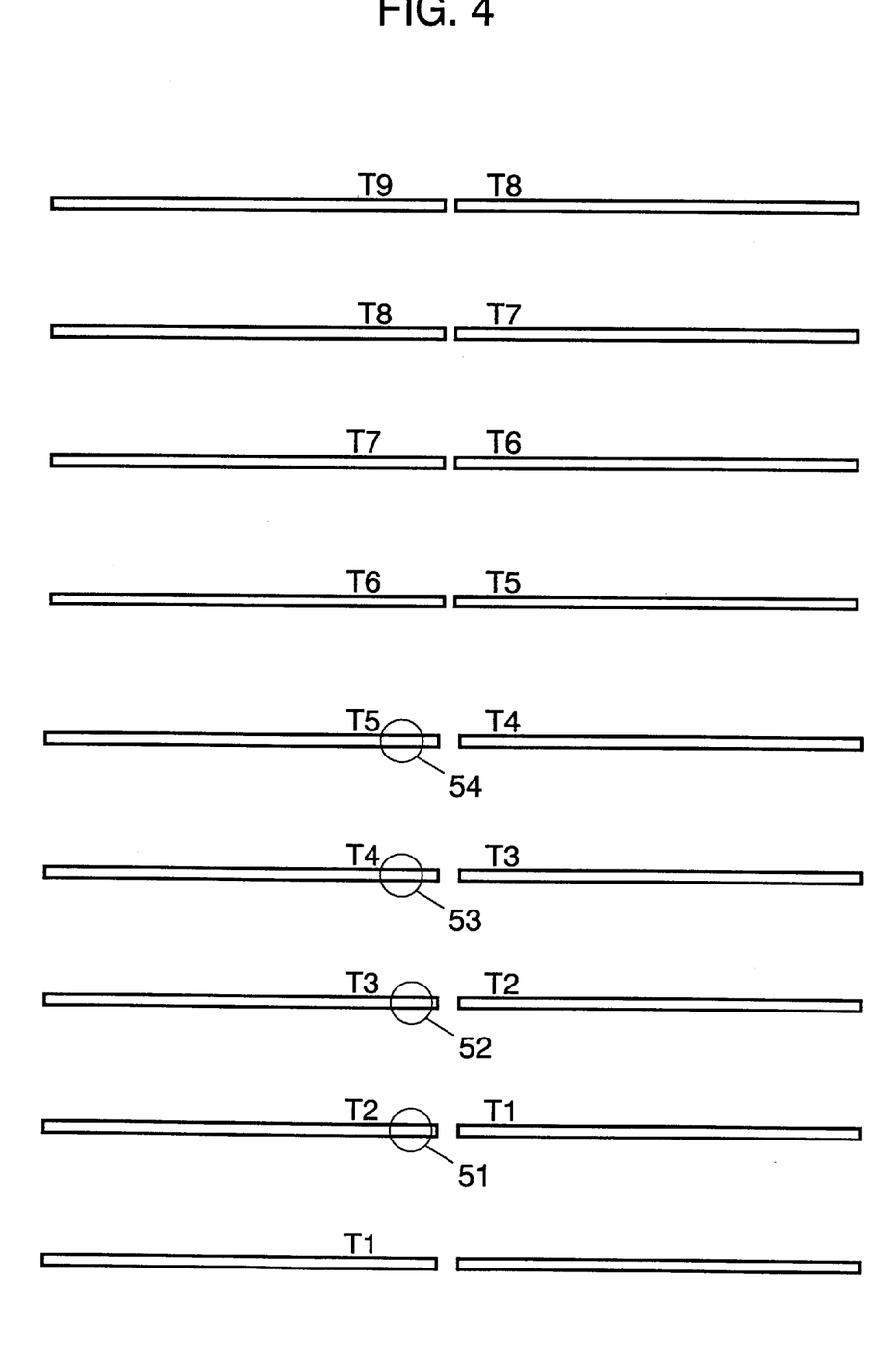
FIG. 4 is a track alignment diagram of an information disk on which tracks are spirally formed.

FIG. 4 is a track alignment diagram of an information disk on which tracks are spirally formed, and reproducing beams 51, 52, 53, 54 respectively trace tracks Tn, Tn+1, Tn+2, Tn+3. Reproducing beams 51, 52, 53, 54 move left with respect to the disk with rotation of the disk, and respectively reach the tops of tracks Tn+1, Tn+2, Tn+3, Tn+4 after one rotation.

In FIG. 2, the reproducing apparatus comprises the following elements:

(a) optical disk 1 on which tracks are formed concentrically or spirally, (b) spindle motor 2 for supporting and rotating optical disk 1, (c) light emitting elements 31, 32, 33, 34 for respectively radiating laser beams to four adjacent tracks on rotating optical disk 1, (d) light receiving elements 41, 42, 43, 44 that receive reflected lights from respective irradiated tracks and convert them to electric signals, (e) optical pickup 5 constituted with light emitting elements 31, 32, 33, 34 and light receiving elements 41, 42, 43, 44, (f) feed motor 6 for moving optical pickup 5 radially of optical disk 1, (g) reproducing circuits 71, 72, 73, 74 for respectively reproducing independent data read simultaneously from four tracks, based on electric signals supplied from optical pickup 5, (h) memory control circuit 8 that temporarily stores the independent data reproduced by reproducing circuits 71, 72, 73, 74 in buffer memory 9, reads out the reproduced data stored in buffer memory 9 in the same order as the alignment of the tracks on optical disk 1, and transmits it to host interface 10, (i) reading-error-occurrence-address-memory 20 for storing error-occurrence-addresses when the reading error occurs, (j) host interface 10 for receiving reproducing instructions or transmitting the reproduced data from/to a host device through terminal 11, and (k) controller 12 for controlling the elements discussed above.

These elements are configured as shown in FIG. 2.

A basic reproducing operation is described hereinafter. When host interface 10 receives the reproducing instructions for adjacent tracks T1 to T4 on optical disk 1 from the host device through terminal 11, controller 12 performs the reproducing operation by sending the instructions to each element. To be more specific, controller 12 controls feed motor 6 to move optical pickup 5 so as to respectively radiate laser beams from light emitting elements 31, 32, 33, 34 to tracks T1, T2, T3, T4 on optical disk 1 rotated by spindle motor 2. At this time, respective reflected lights are converted to electric signals by light receiving elements 41, 42, 43, 44, and these electric signals are further sent to reproducing circuits 71, 72, 73, 74 to be independently reproduced. In the following description, a disk on which data is recorded from the inner radius to the outer radius is illustrated. In a recording order of the data, a reading means and a track which are positioned at the inner radius side on the disk are respectively called a tailing reading means and a tailing track, and a reading means and a track which are positioned at the outer radius side on the disk are respectively called a heading reading means and a heading track. If data is recorded from the outer radius to the inner radius, the relations between these designations and the positions on the disk are reverse. The reproduced independent data for respective tracks is temporarily stored in buffer memory 9 via memory control circuit 8, then is read out in the same order as the alignment of the tracks on optical disk 1, i.e. in the order of T1, T2, T3, T4, and is sent to the host device through host interface 10 and terminal 11. When a reading error occurs here, an address of the error position is stored in reading-error-occurrence-address-memory 20.

Rereading operations of the error-occurrence-address are described hereinafter.

(1) Error recovery of a disk on which data is concentrically recorded as shown in FIG. 3.

The data is recorded on tracks T1, T2, T3 . . . sequentially from the inner track. A case that the data on T2 and later is read out every four tracks is considered.

Because four tracks can be simultaneously reproduced, the data on T2, T3, T4, T5 is simultaneously read out. Reproducing beams 51, 52, 53, 54, light receiving elements 41, 42, 43, 44, and reproducing circuits 71, 72, 73, 74 respectively correspond to T2, T3, T4, T5.

Here, it is assumed that an error occurs on T5. When the error is detected at a part of T5, the error-occurrence-address is stored in memory 20, reproduction of T2, T3, T4, T5 is continued without any track-jump until data corresponding to one circumference of each track has been read, and reproduced data is written into the buffer memory. At this time, the data on T2, T3, T4 and the data before the error-occurrence-address on T5 have already been read without any error, are continuous data from the top data, and therefore, are allowed to be transferred to the host interface.

For rereading the error-occurrence-address on T5, it must be determined whether a track-jump is performed or not. Because the disk rotates even during the track-jump when the error-occurrence-address is at the top of T5, last tailing reproducing beam 51 may travel past the error-occurrence-address.

In this case, two options can be selected: an option that rereading is tried by the original light receiving element and reproducing circuit without any track-jump; and an option that the track-jump is performed, then the track after the jump is read, and finally rereading is tried.

In the option of performing the track-jump, the track-jump is carried out so as to read T5, T6, T7, T8. At this time, reproducing beams 51, 52, 53, 54 respectively correspond to T5, T6, T7, T8. Reproducing beam 51 waits until the error-occurrence-address on T5 reaches the beam position with rotation, and tries to reread the error-occurrence-address. When the rereading can be performed, the data is written into a corresponding address in the buffer memory, and is allowed to be transferred to a host. At this time, heading reproducing beams 51, 52, 53, 54 can continue to reproduce unread tracks T6, T7, T8, and the reproducing rate becomes ¾ of the normal rate.

Even when number of simultaneously readable tracks is larger or smaller, heading light receiving elements (positioned on the outer radius side of the track assigned for reading of the error-occurrence-track) and reproducing circuits (corresponding to these light receiving elements) can similarly continue to reproduce the unread region. When reading errors occur at a plurality of addresses, heading light receiving elements and reproducing circuits can similarly continue to reproduce the unread region by performing the following process: a track-jump is performed on the basis of the earliest heading error-occurrence-address on the last tailing track (positioned on the innermost radius side) of error-occurrence-tracks, i.e. an error-occurrence-address at which the light receiving elements earliest arrive from the tops of the tracks with rotation of the disk.

(2) Error recovery of a disk on which data is spirally recorded as shown in FIG. 4.

A case that the data on T2 and later is read out every four tracks is considered.

Because four tracks can be simultaneously reproduced, the data on T2, T3, T4, T5 is simultaneously read out. Reproducing beams 51, 52, 53, 54, light receiving elements 41, 42, 43, 44, and reproducing circuits 71, 72, 73, 74 respectively correspond to T2, T3, T4, T5.

First, the operation in a case that an error occurs on T5 is described. When the error is detected on T5, the error-occurrence-address is stored in memory 20, the reproduction of T2, T3, T4, T5 is continued until data corresponding to one circumference of each track has been read, and the reproduced data is written into the buffer memory. At this time, the data on T2, T3, T4 and before the error-occurrence-address on T5 has already been read without any error, is continuous data from the top data, and therefore, is allowed to be transferred to the host interface.

Then, a track-jump is performed so as to reread the error-occurrence-address on T5. However, because the data is spirally recorded, respective light receiving elements and reproducing circuits have reached the tops of T3, T4, T5, T6 when data for one rotation is finished to be read. If an error has occurred at the top of T5, the error-occurrence-address has already been passed when the track-jump is finished because the disk further continues to rotate even during the track-jump. Therefore, quantity of the track-jump and the selection whether the track-jump is performed or not must be selected responsive to the error-occurrence-address.

When an error occurs near the top of T5 and the error-occurrence-address can be passed after the track-jump, the track-jump is performed so as to read T4, T5, T6, T7. At this time, reproducing beams 51, 52, 53, 54 respectively correspond to T4, T5, T6, T7. Because the tail end of T4 is positioned at the top of T5, the last tailing reproducing beam 51 waits until the error-occurrence-address reaches the beam position with rotation, and tries to reread the error-occurrence-address. When the rereading can be performed, the data is written into a corresponding address in the buffer memory, and is allowed to be transferred to a host. Because the tail end of T5 is positioned at the top of T6, reproducing beam 52 waits until to the top of T6 reaches it, and continues to read data at the top of T6 passed during the track-jump. Heading reproducing beams 53, 54 can continue to reproduce unread tracks T6, T7, and the reproducing rate becomes ½ of the normal rate.

When an error occurs satisfactorily far away from the top of T5 and the error-occurrence-address is hardly passed after the track-jump, the track-jump is performed so as to read T5, T6, T7, T8. At this time, reproducing beams 51, 52, 53, 54, light receiving elements 41, 42, 43, 44, and reproducing circuits 71, 72, 73, 74 respectively correspond to T5, T6, T7, T8. Latest tailing reproducing beam 51 waits until the error-occurrence-address on T5 reaches the beam position with rotation, and tries to reread the error-occurrence-address. When the rereading can be performed, the data is written into a corresponding address in the buffer memory, and is allowed to be transferred to a host.

In addition, because the tail end of T5 is positioned at the top of T6, reproducing beam 51 reproduces data close to the top of T6 past which reproducing beam 52 travels. Heading reproducing beams 52, 53, 54 can continue to reproduce unread tracks T6, T7, T8, and the reproducing rate becomes ¾ of the normal rate.

Second, a case that an error occurs on T3 is described. Because last tailing reproducing beam 51 has arrived at the top of T3 when readout of the data for one rotation is finished, any track-jump is not required. Reproducing beam 51 waits until the error-occurrence-address reaches the beam position with rotation, and tries to reread the error-occurrence-address. When the rereading can be performed, the data is written into a corresponding address in the buffer memory, and is allowed to be transferred to the host. Heading reproducing beam 54 can continue to reproduce T6, and the reproducing rate becomes ¼ of the normal rate.

Third, when an error occurs near the top of T4 and the error-occurrence-address can be passed after the track-jump, it is also preferable that the track-jump is not performed and rotation waiting is performed until last tailing reproducing beam 51, light receiving element 41, and reproducing circuit 71 arrive near the top of T4. Thus, because data can be read out without any track-jump, reduction of the reading rate can be restrained. At this time, the reproducing rate is ¼ of the normal rate, because heading reproducing beam 54 can continue to reproduce T6.

Figure 5:
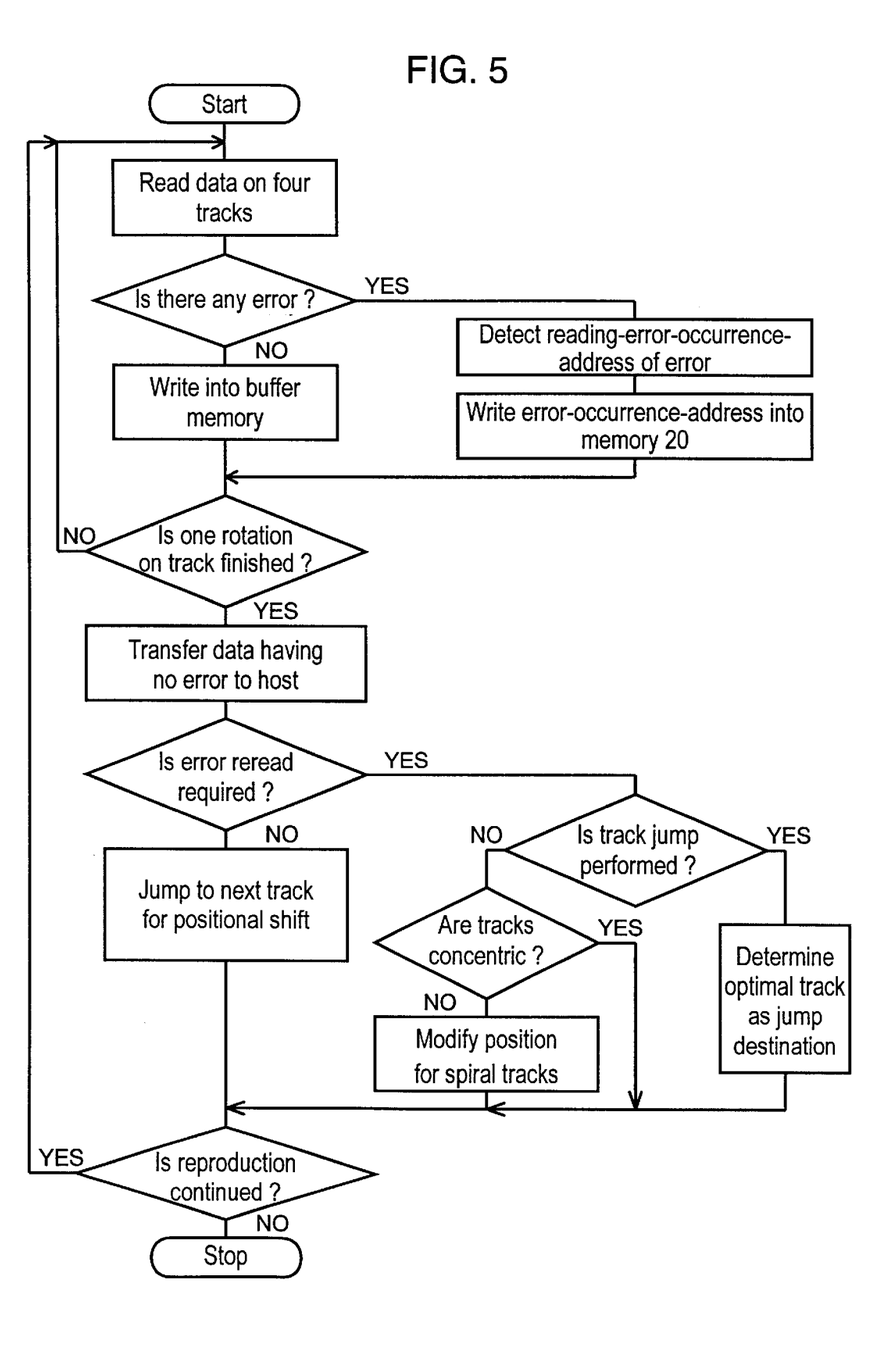
FIG. 5 is a schematic flowchart during a reproducing operation of the apparatus in accordance with the present invention.

FIG. 5 shows the reproducing operation in the present invention using a flowchart. At the beginning of the reproduction operation, four data are simultaneously read in parallel from four tracks, and existence of any error is checked. For the track having no error the data is written into the buffer memory, and for the track having an error the error address is written into memory 20. After the tracks rotate once, the data having no error is transferred to the host. After that, when reproducing of the error-occurrence-address is confirmed and any error is not found, the reproducing is continued by jumping to a next new unread track. When an error occurs, it is checked whether the track-jump is carried out for reproducing the error. At this time, execution of the track-jump is selected and an optimal position of the track-jump is set so as to restrain the reduction of the reading rate to a minimum, depending on whether the track are concentric or spiral and which position on the circumference on which track the error occurs at. More specific description is carried out in the following embodiment.

Even when number of simultaneous readable tracks is larger or smaller, heading light receiving elements (positioned on the outer radius side of the track assigned for reading the error-occurrence-track) and reproducing circuits (corresponding to the light receiving elements) can similarly continue to reproduce the unread regions. When reading errors occur at a plurality of addresses, heading light receiving elements and reproducing circuits can similarly continue to reproduce the unread regions by performing the following process: the track-jump is performed on the basis of the earliest heading error-occurrence-address on the last tailing track (positioned on the innermost radius side) of error-occurrence-tracks, i.e. an error-occurrence-address at which light receiving elements earliest arrive from the tops of the tracks with rotation of the disk.

An estimating method for the reproducing rate depending on whether the track-jump is performed or not is not restricted to the embodiment discussed above. For each system, an estimating method where performance can be estimated to further improve can be selected.

Rereading is tried, after the data on the already read tracks is jumped because of no requirement of the rereading and last tailing light receiving element 41 is jumped onto the error-occurrence-track or a track after the error-occurrence-track. Thus, the heading light receiving element (positioned on the outer radius side of a track assigned for reading the error-occurrence-track) can continue to read the unread region. As a result, the reduction of the reading rate during the rereading can be minimized.

After the error occurrence, the data reading is continued without any track-jump until the data reading on a track being reproduced is finished, and reading of data on the tracks following the error-occurrence-track can be completed. Therefore, reading means can be assigned to the unread region corresponding to the already read track.

Preferred embodiment 2

The embodiment 2 of the present invention is described hereinafter with reference to FIG. 2 and FIG. 4. Its basic reading operation is similar to that in the embodiment 1. When a reading error occurs, an address of the error position on the disk is stored in reading-error-occurrence-address memory 20.

When tracks are spirally formed, respective reading means reach the tops of next tracks after the disk rotates once for trying the rereading, as shown in FIG. 4.

If the error-occurrence-address is not on a track corresponding to light receiving element 41, reproducing beam 51, and reproducing circuit 71, the reading is continued without any track-jump. At this time, a tailing reading means (positioned on the inner radius side of the reading means assigned to the error-occurrence-track) after a reading means assigned for the track having an error can reread the error-occurrence-address, and simultaneously the earliest heading reading means (positioned on the outermost radius side) can read the unread tracks. If the track-jump is performed, data in a part passed even during the track-jump cannot be read because the disk continuously rotates during the track-jump. In this method, however, the track-jump is not performed. Therefore, time loss for the track-jump is eliminated, and the earliest heading track can continue to read the data in the unread regions. As a result, the reduction of the reading rate during the rereading can be minimized.

Preferred embodiment 3

The embodiment 3 of the present invention is described hereinafter with reference to FIG. 2, FIG. 3, and FIG. 4. Its basic reading operation is similar to that in the embodiment 1. When a reading error occurs, an address of the error position on the disk is stored in reading-error-occurrence-address memory 20.

First, the case that tracks are spirally formed is considered. As described in the embodiment 1, since many reading means are assigned to unread tracks, the reading rate may be reduced when a track-jump is performed for trying rereading. For example, two following cases are considered. When the error-occurrence-address is at the top of a track, the error-occurrence-address is passed during the track-jump and the address cannot be reread until one more rotation is finished. When the error-occurrence-address is on track Tn+1 corresponding to last tailing light receiving element 41, reproducing beam 51, and reproducing circuit 71, the last tailing reading means (positioned on the innermost radius side) has arrived at the top of the error-occurrence-track after the data for one rotation is read, and therefore no track-jump is required. As a result, the reading rates, for the cases that the track-jump is performed and that the track-jump is not performed, are estimated based on the error-occurrence-address and number of simultaneous readable tracks, and the case that the rate reduction during the rereading is smaller is selected.

Second, in the case that tracks are concentrically formed, the reproducing operation is slightly different. FIG. 3 is a track alignment diagram of an information disk on which tracks are concentrically formed, and reproducing beams 51, 52, 53, 54 respectively trace tracks Tn, Tn+1, Tn+2, Tn+3. Reproducing beams 51, 52, 53, 54 move left with respect to the disk with the rotation of the disk, and return to their original positions after one rotation. When the error-occurrence-address is on the track corresponding to last tailing light receiving element 41, reproducing beam 51, and reproducing circuit 71, no track-jump is performed, and the rereading of the error-occurrence-address is tried using a reading means assigned to the error-occurrence-track. In the other case except that the error-occurrence-address is near the top of the track and is passed during the track-jump, the track-jump is performed and larger number of reading means are assigned to the unread tracks.

As discussed above, since any unnecessary track-jump is not performed for rereading in the error occurrence, time for the track-jump is not required. When the track-jump is performed, the heading track can continue to read data in the unread region even during rereading in the error occurrence. Therefore, the reduction of the reading rate during the rereading can be minimized.

Preferred embodiment 4

The embodiment 4 of the present invention is described hereinafter. Its basic reading operation is the same as that in the embodiments 1, 2, 3. In a case that number of error-occurrence-addresses is two or more, a reference error-occurrence-address used when the last tailing reading means is jumped to the error-occurrence-track or a tailing track (positioned on the inner radius side of the error-occurrence-addresses) after the error-occurrence-addresses on the disk and a reference error-occurrence-address used for evaluating whether a track-jump is performed or not are defined as follows. The reference error-occurrence-addresses are defined as the reading-error-occurrence-address closest to the top of the last tailing track (positioned on the innermost radius side) of the tracks having errors, i.e. the error-occurrence-address which light receiving elements earliest reach from the tops of the tracks due to rotation of the disk. Thus, even when reading errors occur at a plurality of addresses, the rereading of all error-occurrence-addresses can be tried using any reading means during one rotation of the disk after the track-jump.

As discussed above, even when number of error-occurrence-addresses is two or more, since any unnecessary track-jump is not performed for rereading in the error occurrence, time for the track-jump is not required. In addition, the heading reading means (positioned on the outer radius side of the reading means assigned to the error-occurrence-tracks) can continue to read data in the unread region even during rereading in the error occurrence. Therefore, the reduction of the reading rate during the rereading can be minimized.

Preferred embodiment 5

The embodiment 5 of the present invention is described hereinafter. An operation when rereading of the error-occurrence-address is finished is described. The operation when the rereading of the error-occurrence-address is finished is considered to be the same between disks on which data is formed concentrically and spirally, respectively.

For example, when a reading-error occurs at a position ½ rotation away from the top of T2, reproducing beams 51, 52, 53, 54, light receiving elements 41, 42, 43, 44, and reproducing circuits 71, 72, 73, 74 are respectively assigned to T2, T3, T4, T5, and T5 is assigned to be an unread track. In this case, a reading rate of the unread track during the rereading operation is about ¼ of the normal rate, because data on only one track of four simultaneously readable tracks can be read out. It is assumed that the error-occurrence-address at the position ½ rotation away from the top of T2 is successfully reread, the track-jump is performed, and reproducing beams 51, 52, 53, 54 are respectively assigned to T4, T5, T6, T7. Because T4 has been already read, the reproducing rate during ½ rotation is ¾ of the normal rate. Because the reproducing head is positioned at the top of T5 after the ½ rotation, the reproducing rate becomes 1/1.

After the track-jump, however, the read data during the rereading must be considered invalid, because data passed during the track-jump cannot be read out until the disk rotates once. An average rate from the beginning of the rereading to the finishing of one rotation, for the cases that the track-jump is performed and that reading is continued without any track-jump, are estimated, and the case that rate reduction is smaller must be selected. In this example, the average reading rate from the beginning of the rereading to the finishing of one rotation is (¾)*(½)=⅜ of the normal rate. This value is higher than the reading rate ¼ derived when no track-jump is performed after rereading, and therefore, performing of the track-jump just after the finishing of the rereading can further decrease the reduction of the reading rate.

Next, when a reading-error occurs at a position ¾ rotation away from the top of T2, reproducing beams 51, 52, 53, 54, light receiving elements 41, 42, 43, 44, and reproducing circuits 71, 72, 73, 74 are respectively assigned to T2, T3, T4, T5, and T5 is an unread track, the following result is derived. In this case, the reading rate of the unread track during the rereading operation is about ¼ of the normal rate, because data on only one track of four simultaneously readable tracks can be read out. It is assumed that the error-occurrence-address at the position ¾ rotation away from the top of T2 is successfully reread, a track-jump is performed, and reproducing beams 51, 52, 53, 54 are respectively assigned to T4, T5, T6, T7. Because T4 has been already read, the reproducing rate during ¼ rotation is ¾ of the normal rate. After the ¼ rotation, the reproducing rate is 1/1 because it is positioned at the top of T5. When the track-jump is performed during the rereading, the read data is considered invalid because data passed during the track-jump cannot be read out until the disk rotates once. An average rate from the beginning of the rereading to the finishing of one rotation is (¾)*(¼)=3/16 of the normal rate. This value is lower than the reading rate ¼ derived when of no track-jump is performed after rereading, and therefore, performing no track-jump just after the finishing of the rereading can further decrease the reduction of the reading rate.

When reading rates between the case that the track-jump is performed and the case that no track-jump is performed are equal to each other after the finishing of the rereading, the data cannot be read during the track-jump, and therefore, the method in which no track-jump is performed further increases the reading rate.

An operation after the finishing of the rereading of the error-occurrence-address is hereinafter summarized.

When the track-jump is performed just after the finishing of the rereading of the error-occurrence-address, the same number of reading means as the case that no reading error occurs can be assigned to the unread tracks, and larger number of reading means than that during the rereading can be assigned to the unread tracks. When number of error-occurrence-addresses is two or more, a similar effect is obtainable by performing the track-jump after the finishing of the rereading of all error-occurrence-addresses. However, if the track-jump is performed from the beginning of the rereading before the finishing of the reading of the data for one disk rotation, the already read data on the unread track must be abandoned. That is because the disk continues to rotate even during the track-jump, a part passed during the track-jump on the unread track cannot be read until the finishing of one disk rotation after the track-jump, and therefore, the data on the already read part must also be reread. Therefore, on the precondition that the data on the unread track which is read during the rereading of the error-occurrence-address is abandoned after the track-jump, and on the basis of number of unread tracks and the error occurrence position on the track, a method that further decreases the reduction of the reading rate must be selected from the following two methods:

(1) The track-jump is performed just after the finishing of the rereading of the error-occurrence-address;

(2) The reading of the track being read is continued until the finishing of the reading of the data for one disk rotation.

In addition, by combining the method with the track-jump during the rereading of the error-occurrence-address in the embodiments 1, 2, 3, 4, a more effective operation can be expected.

As discussed above, the method that further decreases the reduction of the reading rate is selected from the following two methods:

(1) The track-jump is performed just after the finishing of the rereading of the error-occurrence-address, and larger number of reading means are assigned to the unread track;

(2) The reading of the data on the track being read is continued.

Therefore, the reduction of the reading rates due to the rereading can be minimized.

Preferred embodiment 6

The embodiment 6 of the present invention is described hereinafter. When number of error-occurrence-addresses is two or more, estimation of the reading rate becomes complicated. The simplest method is to evaluate whether the track-jump is performed or not after the finishing of the rereading of all error-occurrence-addresses. However, for further decreasing the reduction of the reading rate, the following evaluation is performed.

It is assumed that reading errors occur at a position ½ rotation away from the top of T2 and a position ¾ rotation away from the top of T4, reproducing beams 51, 52, 53, 54, light receiving elements 41, 42, 43, 44, and reproducing circuits 71, 72, 73, 74 are respectively assigned to T2, T3, T4, T5, and T5 is an unread track. When the reading-error-occurrence-address at the position ½ rotation away from the top of T2 is successfully reread and then a track-jump is performed, the other reading-error-occurrence-address of T4 exists after more ¼ rotation, and therefore reproducing beams 51, 52, 53, 54 can be respectively assigned to T4, T5, T6, T7. Because T4 has been already read, the reproducing rate during the subsequent ½ rotation is ¾ of the normal rate, and the reproducing rate after the ½ rotation becomes 1/1 because T4 is positioned at the top of T5. The data on T5 read before the track-jump becomes invalid, and an average reading rate between the beginning of the rereading and the finishing of one rotation becomes (¾)*(½)=⅜ of the normal rate. This value is higher than the reading rate ¼ derived when no track-jump is performed after rereading, and therefore, performing of the track-jump just after the finishing of the rereading can further decrease the reduction of the reading rate. After that, when rereading of the error-occurrence-address on T4 is finished, the reading rate for one rotation is recalculated similarly to the case of T2 based on the error-occurrence-address on T2, and whether track-jump is performed after rereading of T4 is determined.

The basic operation is the same as the method for performing the track-jump after the rereading of the reading-error-occurrence-address as described in the embodiment 5. When reading errors occur on a plurality of tracks, depending on the positional relation among the error-occurrence-addresses, the following method may be expected to increase the reading rate:

(1) The track-jump is performed after the finishing of the rereading of all error-occurrence-addresses on the last tailing error-occurrence-track; and (2) Larger number of reading means are assigned to the unread track.

For example, it is the case that reading errors occur near the top of a track assigned to the last tailing reading means (positioned on the innermost radius side) and at the rear part on a track assigned to the earliest heading reading means (positioned on the outermost radius side). In this case, the reading means cannot be assigned to the unread tracks during the rereading of the error-occurrence-addresses.

When the track-jump is performed just after the finishing of the rereading of the error-occurrence-address (positioned on the innermost radius side) on the last tailing track so as to assign the last tailing reading means (positioned on the innermost radius side) to a remaining reading-error-occurrence-address, (number of simultaneously readable tracks—1) of tracks can be assigned to the unread tracks. Even in other cases, reading rates in the cases that the track-jump is performed and that no track-jump is performed are estimated based on the number of the unread tracks and the error-occurrence-addresses on the tracks, and one of the following processes is selected every finishing of all reading-error-occurrence-addresses on the track assigned to the last tailing reading means (positioned on the innermost radius side):

(1) The track-jump is performed;

(2) The reading of the track being read is continued.

In addition, by combining the process with the track-jump during the rereading of the error-occurrence-address in the embodiments 1, 2, 3, 4, more effective operation can be expected.

Even when number of simultaneously readable tracks is larger or smaller in all embodiments discussed above, a similar process can be carried out.

In these embodiments, descriptions about an optical disk are given. For a magnetic disk, a magnetic head can used instead of optical pickup 5.

The estimating methods of the reproducing rate depending on whether the track-jump is performed or not are not restricted to the embodiments discussed above. In each systems, an estimating method can be selected in which improvement of the reproducing rate can be expected.

In the embodiments discussed above, examples using the optical disk are descried. A similar effect is expectable for an information disk system such as the magnetic disk or a magneto-optical disk.

While the cases that data is recorded from the inner radius to the outer radius on the disk are illustrated in the embodiments 1 to 6, the similar method can be carried out even for a disk on which data is recorded from the outer radius to the inner radius. Positional relation among the heading track, the tailing track, the reproducing beams, the light receiving elements, and the reproducing circuits in this case is reverse to the disk on which the data is recorded from the inner radius to the outer radius.

INDUSTRIAL APPLICABILITY

In a reading-error recovery method in the present invention, a heading reading means can read data on unread tracks even during rereading of an error-occurrence-address, and therefore, reduction of the reading rate during the rereading of the reading-error-occurrence-address can be minimized.

In the reading-error recovery method, an optimal track-jump can be performed during the rereading of the reading-error-occurrence-address on a disk on which tracks are concentrically formed. Thus, when the track-jump is performed, the heading reading means can continue to read the data on the unread tracks even during the rereading of the error-occurrence-address. When no track-jump is performed, a period when the data cannot be read due to the track-jump is eliminated, and therefore the reduction of the reading rate during the rereading of the reading-error-occurrence-address can be minimized.

In the reading-error recovery method, an optimal track-jump can be performed during the rereading of the reading-error-occurrence-address even when reading errors occur at two or more positions. As a result, the reduction of the reading rate during the rereading of the reading-error-occurrence-address can be minimized.

In the reading-error recovery method, larger number of reading means are assigned to the unread tracks after the finishing of the rereading of the error-occurrence-address. As a result, the reduction of the reading rate just after the finishing of the rereading of the reading-error-occurrence-address can be minimized.

In the reading-error recovery method, an optimal track-jump can be performed after the finishing of the rereading of the reading-error-occurrence-address. When the track-jump causes reduction of the reading rate, no track-jump is performed after the finishing of the rereading. When the track-jump is expected to improve the reading rate, the track-jump is performed, and larger number of reading means are assigned to the unread tracks. Therefore, the reduction of the reading rates due to the rereading of the reading-error-occurrence-address can be minimized.

In the reading-error recovery method, an optimal track-jump can be performed after the finishing of the rereading of the reading-error-occurrence-address, even when reading-errors occur on a plurality of tracks. Therefore, the reduction of the reading rates due to the rereading of the reading-error-occurrence-address can be minimized.

In the embodiments in the present invention, examples using the optical disk are descried. However, the similar effect is expectable for an information disk system such as a magnetic disk or a magneto-optical disk.

What is claimed is:

1. A method of performing error recovery while reading tracks on a disk, said method comprising the steps of:

storing information related to a location where an error has occurred while reading from said disk;

calculating an effective reading rate if said location is reread without a track jump;

calculating a further effective reading rate if said track jump is performed prior to rereading said location, wherein an amount of said track jump is based on:
 a) in which one of said tracks said error has occurred; and
 b) wherein said one of said tracks, said error occurred, comparing said effective reading rate with said further effective reading rate; and determining whether to make said track jump prior to rereading said location based on a result of said comparison.

2. A method of performing error recovery according to claim 1, wherein said tracks are spiral.

3. A method of performing error recovery according to claim 1, wherein said tracks are concentric.

4. A method of performing error recovery according to claim 1, further comprising the step of performing a further track jump in the middle of rereading said one of said tracks.

5. A method of performing error recovery according to claim 1 further comprising the step of performing a further track jump at the end of rereading said one of said tracks.

6. A method of performing error recovery according to claim 1, wherein said track jump is for a number of tracks corresponding to a number of light receiving elements reading said disk if no error has occurred.

* * * * *